United States Patent [19]

Shutts

[11] Patent Number: 5,453,921
[45] Date of Patent: Sep. 26, 1995

[54] FEEDBACK LIMITED DUTY CYCLE SWITCHED MODE POWER SUPPLY

[75] Inventor: Bruce W. Shutts, Carmel, Ind.

[73] Assignee: Thomson Consumer Electronics, Inc., Indianapolis, Ind.

[21] Appl. No.: 41,232

[22] Filed: Mar. 31, 1993

[51] Int. Cl.$^6$ .................................................. H02M 3/335
[52] U.S. Cl. .................................................. 363/21; 363/41
[58] Field of Search ........................ 363/21, 41, 72, 363/95, 97, 131

[56] References Cited

U.S. PATENT DOCUMENTS

| | | | |
|---|---|---|---|
| 4,288,831 | 9/1981 | Dolikian | 363/26 |
| 4,305,010 | 12/1981 | Wise | 307/270 |
| 5,231,564 | 7/1993 | Pellegrino et al. | 363/61 |

FOREIGN PATENT DOCUMENTS

| | | | |
|---|---|---|---|
| 0308622 | 9/1987 | European Pat. Off. | H02M/3/335 |
| 2-111257 | 4/1990 | Japan | H02M/3/28 |
| 5-344642 | 12/1993 | Japan | H02H/7/20 |

OTHER PUBLICATIONS

Patent Abstracts of Japan, vol. 14, No. 328, 13 Jul. 1990.
Patent Abstracts of Japan, vol. 18, No. 180, 28 Mar. 1994.
TEA 2260 High Performance Driver Circuit for S M P S, SGS–Thomson Microelectronics, Apr. 1989.
CTC170 Technical Training Manual, Direct View TV, ProScan, IDTV, Thomson Consumer Electronics, Inc., pp. 40–59, 86–88, dated 1992.

*Primary Examiner*—Steven L. Stephan
*Assistant Examiner*—Matthew V. Nguyen
*Attorney, Agent, or Firm*—J. S. Tripoli; J. J. Laks

[57] ABSTRACT

A switched mode power supply includes a modulator s an input for receiving a sense signal and an output for developing a pulse modulated signal. An output switch is coupled to the modulator and is switched in accordance with the pulse modulated signal. A generator develops a supply voltage responsive to operation of the switch. A feedback circuit coupled between the modulator output and a modulator input limits the duty cycle of the pulse modulated signal.

19 Claims, 6 Drawing Sheets

FEEDBACK LIMITED DUTY CYCLE SWITCHED MODE POWER SUPPLY

This invention relates to switched mode power supplies.

BACKGROUND

In television receivers having run and standby modes and using switched mode power supplies, an unregulated DC voltage is derived from a bridge rectifier coupled to a mains source. The unregulated DC voltage is then supplied to a primary winding of a power transformer that isolates the hot ground side of the chassis from the cold ground side. A standby regulator, such as the SGS Thomson Microelectronics TEA2260 or TEA2261, is located on the hot side and controls a switching means such as a chopper transistor to apply current pulses of variable pulse width and amplitude to the primary winding. Regulated voltages are developed on secondary windings of the power transformer. The standby regulator is powered from the unregulated B+ voltage when the television receiver is first coupled to the mains, and thereafter provides the regulating action in a standby mode of operation until the apparatus is switched into the run mode, whereupon the standby regulator is controlled by a run regulator located on the hot ground side.

Loads other than the standby regulator, including the standby loads and run mode loads such as the horizontal deflection circuit, are coupled to secondary windings of the power transformer. The run mode loads are inactive in the standby mode. Run mode loads may be coupled to regulated voltages, but switched off in the standby mode by a signal from a controller such as a microprocessor responsive to a remote control. Alternatively, run mode loads may be coupled to secondary windings of the horizontal flyback transformer, and are unpowered in the standby mode because, although the flyback transformer is coupled to a regulated B+ voltage, no voltages are generated in the secondary windings of the flyback transformer in the absence of horizontal scanning.

The standby regulator operates at a stable frequency and has a pulse width modulator that regulates voltages on the secondary windings of the power transformer by adjusting the pulse width or duty cycle of the voltage pulses applied to the chopper transistor. In the standby mode, the standby regulator is made to free run at its local oscillator frequency, and regulates by sensing the voltage on a hot ground secondary winding of the power transformer. The sensed voltage is coupled to an input of an error amplifier having a second input coupled to a voltage reference. Regulation of the B+ scan supply voltage occurs indirectly, because the voltages on all the secondary windings go up or down together.

In the run mode, the standby regulator becomes the slave of a run regulator on the cold ground side. The run regulator may be, for example, the SGS Thomson Microelectronics TEA5170. The standby regulator continues to switch the chopper transistor on the primary winding of the power transformer for producing regulated voltages on the secondaries, but the standby regulator is driven in the run mode by a pulse width modulation signal generated by the run regulator. The run regulator is synchronized with the horizontal deflection by e.g. horizontal flyback pulses. The regulated B+ voltage for the horizontal deflection circuit is fed back to an error amplifier in the run regulator and compared to a reference for generating the pulse width modulation signal that is coupled back to the standby regulator. The pulse output of the run regulator is used in the run mode to supplant the output of pulse width modulation circuitry in the standby regulator.

When the feedback to whichever of the regulators that is controlling, differs from the applicable reference level, the regulator's pulse width modulation circuit changes the pulse width or duty cycle of output pulses, to vary the power through the power transformer and regulate the output voltage. In order to avoid generating too much current in the chopper transistor and power transformer, a number of safety features are built into the run and standby regulators and into the controller that switches between run and standby modes.

A current sensing resistor is coupled in series with the chopper. This resistor provides a voltage representing the current level in the chopper and in the primary winding to a shutdown circuit in the standby regulator. The shutdown circuit of the TEA2260/61 has two threshold levels. If current passes a lower threshold, the on-pulse of the pulse width modulated output is immediately terminated but is redeveloped at the next cycle of operation. If current passes a higher threshold, the standby regulator shuts down and will not restart until VCC is removed, e.g. by pulling the mains plug.

The standby and run regulators each include other protective features and sensing circuits arranged to disable operation when their VCC power supply voltages goes above or below internally defined reference levels.

Each regulator also has circuitry to limit the maximum duty cycle of its output by substituting a fixed duty cycle output when the feedback loop attempts to drive the output duty cycle beyond a predetermined limit.

These and other protective features generally handle the load increases that occur with startup and when switching from standby to run, when the pulse width modulators would otherwise seek to increase the duty cycle of the pulse output to bring the output voltages up to their references, with possible damage to the chopper. However, it remains possible that under certain conditions, particularly in the run mode, that changes in loading can cause the duty cycle to be varied rapidly to a point where the chopper transistor is overstressed.

The maximum duty cycle of the TEA5170 run mode regulator is, for example, nominally 78%. The normal duty cycle may be relatively high when the television receiver is a high powered e.g., a large screen set operating under high load conditions, such as high picture brightness and high audio loading. The duty cycle also will be relatively high if the AC mains voltage is relatively low.

These situations may cause the duty cycle of the run regulator to occasionally reach its upper limit. Where operation is such that loading in the run mode varies, for example when the picture includes a change from very dark to very light areas, the run regulator also may increase the duty cycle to its upper limit. This could result in a potential overstressed operating condition.

Another potential problem is encountered when AC mains voltage is lost when operating in the run mode. This can occur in the event of a power outage or when the television receiver is unplugged while operating in the run mode. As the mains voltage is falling, the run regulator increases the duty cycle of the chopper in an attempt to maintain the nominal regulated B+ output voltage. The VCC sensing and maximum current protective features of the run and standby regulators may be marginal or ineffective in preventing overstress conditions in the chopper due to excessive duty cycle operation or fluctuations.

The television receiver microprocessor which generates the ON/OFF signal for switching between run and standby modes is typically supplied with a power reset circuit which detects loss of operating supplies. Once such loss is detected on, e.g., an AC line isolated supply, the microprocessor generates the OFF state of the ON/OFF signal and power to the run regulator is removed. Because power loss is sensed from a secondary winding, activation of the reset circuit may come too late to avoid overstressing the chopper transistor in an AC power loss environment.

SUMMARY

According to an inventive arrangement, a switched mode power supply includes a modulator that has an input for receiving a sense signal and an output for developing a pulse modulated signal. An output switch is coupled to the modulator and is switched in accordance with the pulse modulated signal. A generator develops a supply voltage responsive to operation of the switch. A feedback circuit coupled between the modulator output and a modulator input limits the duty cycle of the pulse modulated signal.

DESCRIPTION OF THE INVENTION

Figure 1:
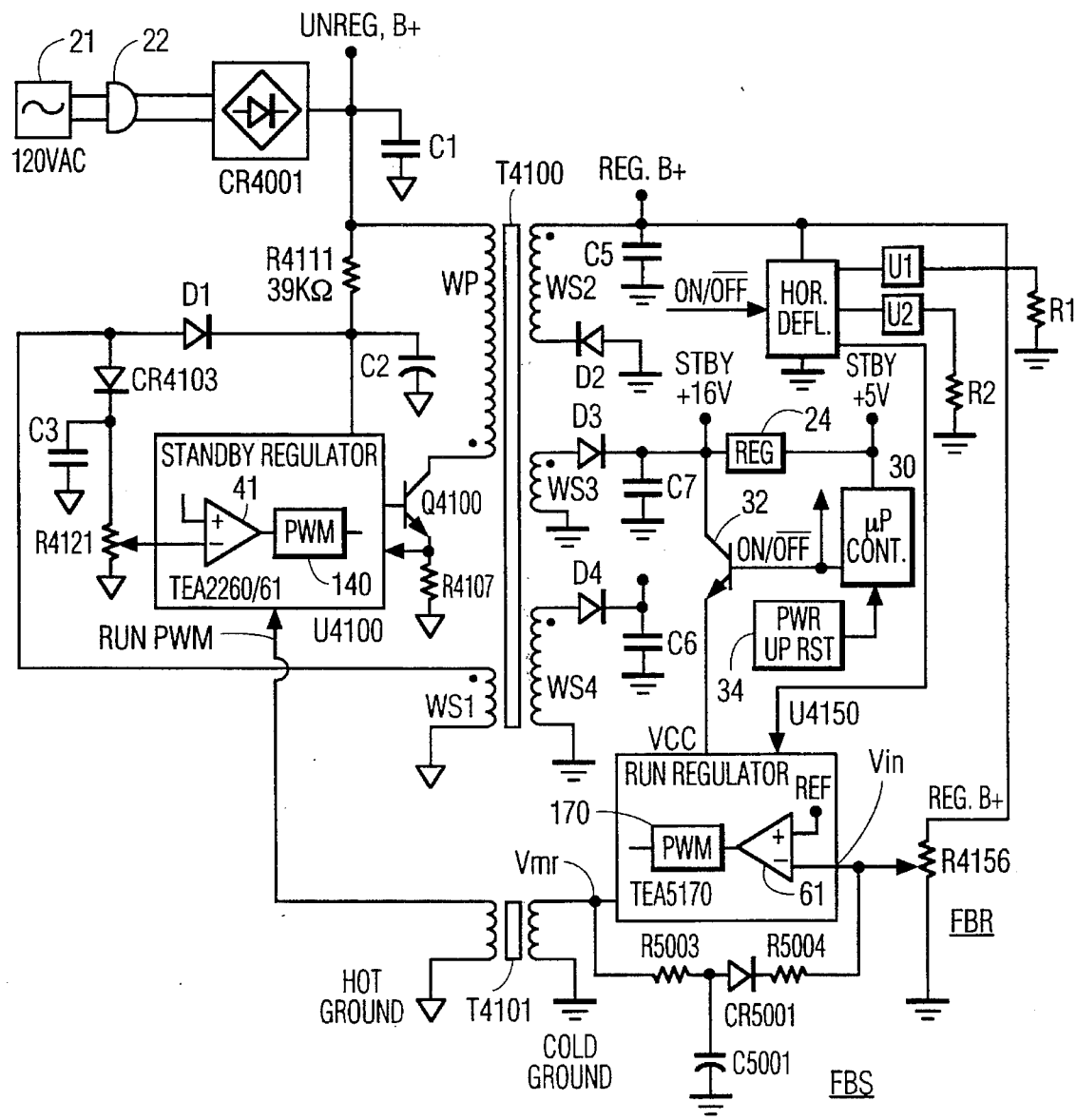
FIG. 1 is a generalized schematic diagram showing a feedback limited duty cycle switched mode power supply according to the invention.

FIG. 1 illustrates a master-slave switched mode power supply circuit based on the SGS Thomson Microelectronics TEA2260 or TEA2261 standby regulator as the slave regulator and the TEA5170 as the run regulator or master. A power transformer T4100 has a primary winding WP coupled to an unregulated DC voltage generated in a capacitor C1 and developed from an AC mains source 21 that is coupled to a bridge rectifier CR4001 via a plug 22. Regulated voltages are maintained on a number of secondary windings WS1–WS4, each of which is coupled to a respective one of rectifier D1–D4, for developing regulated DC voltages. These voltages power various loads which are operable in a run mode and/or a standby mode of the television apparatus.

A chopper transistor Q4100 forms a switching means coupled to primary winding WP, operable for controllably switching current from the unregulated DC voltage source, through primary winding WP. The peak current in primary winding WP is controllably varied by pulse width modulation for coupling a variable amount of power through transformer T4100, as the requirements of loads on the power supply vary. In the standby mode, power requirements are low, and regulation is accomplished via independent operation of a standby regulator U4100. In the run mode, when power requirements are high and precise voltage regulation is needed, standby regulator U4100 operates as the slave of a run regulator or modulator stage U4150, via a pulse width modulation signal coupled to the standby regulator through a transformer T4101. The two transformers T4100 and T4101 provide electrical shock hazard isolation by dividing the chassis circuits between a hot ground side associated with the unregulated mains voltage side and a cold ground side associated with the side where most of the regulated voltages are developed.

In the standby mode, standby regulator U4100 obtains its VCC supply voltage initially from the unregulated B+ voltage directly, by means of a filter capacitor C2 that is charged through a resistor R4111 upon coupling of the circuit to the AC mains, i.e. by connecting plug 22 into source 21. Once the standby regulator begins to operate and produce pulses at the base of chopper transistor Q4100, a secondary winding WS1 on the hot ground side develops a voltage that is rectified by a diode D1 and filtered by a capacitor C2 to provide VCC for the standby regulator.

Standby regulator U4100 has an error amplifier 41 and a pulse width modulation circuit 140 for regulating the voltages on all the secondary windings by feedback of a voltage level on secondary WS1. The sense input of the error amplifier is coupled to secondary WS1 via a rectifier CR4103, a filter capacitor C3 and a voltage divider shown by a potentiometer R4121. The output of the error amplifier controls the pulse width modulation circuit 140 and the duty cycle of chopper Q4100.

The TEA2260/61 regulator includes various protective features intended to avoid excessive current in primary winding WP and in chopper Q4100. Main current in primary winding WP and chopper transistor Q4100 is sensed using a sampling resistor R4107 that is coupled in series with the chopper. Resistor R4107 produces a current sense voltage coupled to the standby regulator. The current sense voltage is applied to logic circuits in the TEA2260/61, not shown in FIG. 1, to disable the pulse output to the chopper if excessive current is detected.

Voltages on the respective secondaries WS2–WS4 are rectified and applied to power the run mode loads and the standby mode loads on the cold ground side of the supply. Some of the loads, R1 and R2, that are to operate in the run mode but not in the standby mode, are coupled to a horizontal deflection circuit 20, including a flyback transformer, not shown, driven at the horizontal scanning frequency of 2 fH, where fH is a standard deflection frequency of, e.g., 16 kilohertz.

Horizontal deflection circuit 20 generates supply voltages U1 and U2 that power loads R1 and R2. Voltage U1 may be the ultor voltage, and R1 may be the picture tube anode which draws beam current. Voltage U2 may be a low voltage which powers a load R2 such as the vertical deflection circuit. These voltages are generated only during horizontal scanning, since the deflection circuit is disabled in the standby mode by the OFF state of an ON/OFF signal supplied by a controller 30.

Other run mode loads or supplies, including VCC for run regulator U4150, are switched on or off by signals from controller 30. Controller 30 may be, for example, a system control microprocessor that responds to control inputs from an infrared remote control, not shown. Controller 30 switches power to the switched run mode loads via the ON/OFF signal applied to one or more switching means represented generally in FIG. 1 by transistor 32. Controller 30 is also coupled to a power reset circuit 34, thus ensuring that the system comes up in the standby mode when initially powered, or after an AC power interruption.

Run regulator U4150 similarly has an error amplifier 61 with a sense input, for controlling a pulse width modulator and producing output pulses Vmr with a duty cycle varied as needed to regulate the voltage Vin at the sense input. The sense input of the run regulator is coupled to the regulated B+ supply via a potentiometer R4156 that is part of a regulator feedback circuit FBR.

According to an inventive feature, the sense input to error amplifer 61 is also coupled to a second feedback means FBS for feeding back the pulse width modulated output Vmr of the regulator to an input such as the sense input of the regulator. This limits the duty cycle of the output, and in particular the duty cycle of the chopper transistor Q4100 in the event of a sudden load increase or loss of AC mains voltage. By providing this safety feedback, the power supply reduces reliance on the overcurrent protection circuits in the slave standby regulator, and reduces undesired oscillation of the pulse-on-time.

Feedback circuit FBS includes a means for averaging a level of the output of the regulator U4150, namely an integrator 100 which integrates PWM voltage Vmr. Integrator 100 is formed by a series resistor R5003 and a parallel capacitor C5001. The voltage on capacitor C5001, varies as a function of the duty cycle of the variable width pulse output, because the DC component of the output is, e.g. higher with a higher duty cycle. Resistors R5003, R5004 and R4156 affect the gain of this negative feedback loop.

Advantageously, a blocking diode CR5001 is coupled in the feedback loop in series with the output of integrator 100. Blocking diode CR5001 is reversed biased when the average of the pulse width modulated output voltage, as represented by the voltage on capacitor C5001, is below the level established at the sense input of error amplifier 61. Accordingly, feedback loop FBS is disabled at low levels of duty cycle and run regulator U4150 is able to respond rapidly to load changes for maintaining good regulation of the regulated B+ voltage. When the duty cycle is high enough to forward bias diode CR5001, the safety feedback loop is enabled. It then moderates the extent to which the run regulator will increase the duty cycle of the pulse modulated output upon sudden increase of loading or other stressful conditions.

The increased loading requirements sensed by the run regulator may be due to a change in operation of the television receiver due to the brightness of the picture being displayed or due to audio loading increases. The run regulator also senses an increased requirement for power that indicates a need for an increased duty cycle when the supply voltage from the AC mains is reduced.

A severe circumstance occurs when AC power is lost while in the run mode, e.g., due to an AC mains power failure or due to unplugging of the television receiver from the AC mains source. During the interval before falling VCC levels signal a controller reset and switching into the standby mode, and/or before the protective circuits built into the TEA2260/61 standby regulator become active, there is a danger that the output pulse width will be rapidly increased by the run regulator in an attempt to maintain the B+ voltage level constant. This produces higher peak currents and other potential damaging operating conditions for chopper transistor Q4100. The inventive feedback circuit FBS reduces or eliminates this problem.

Figure 2:
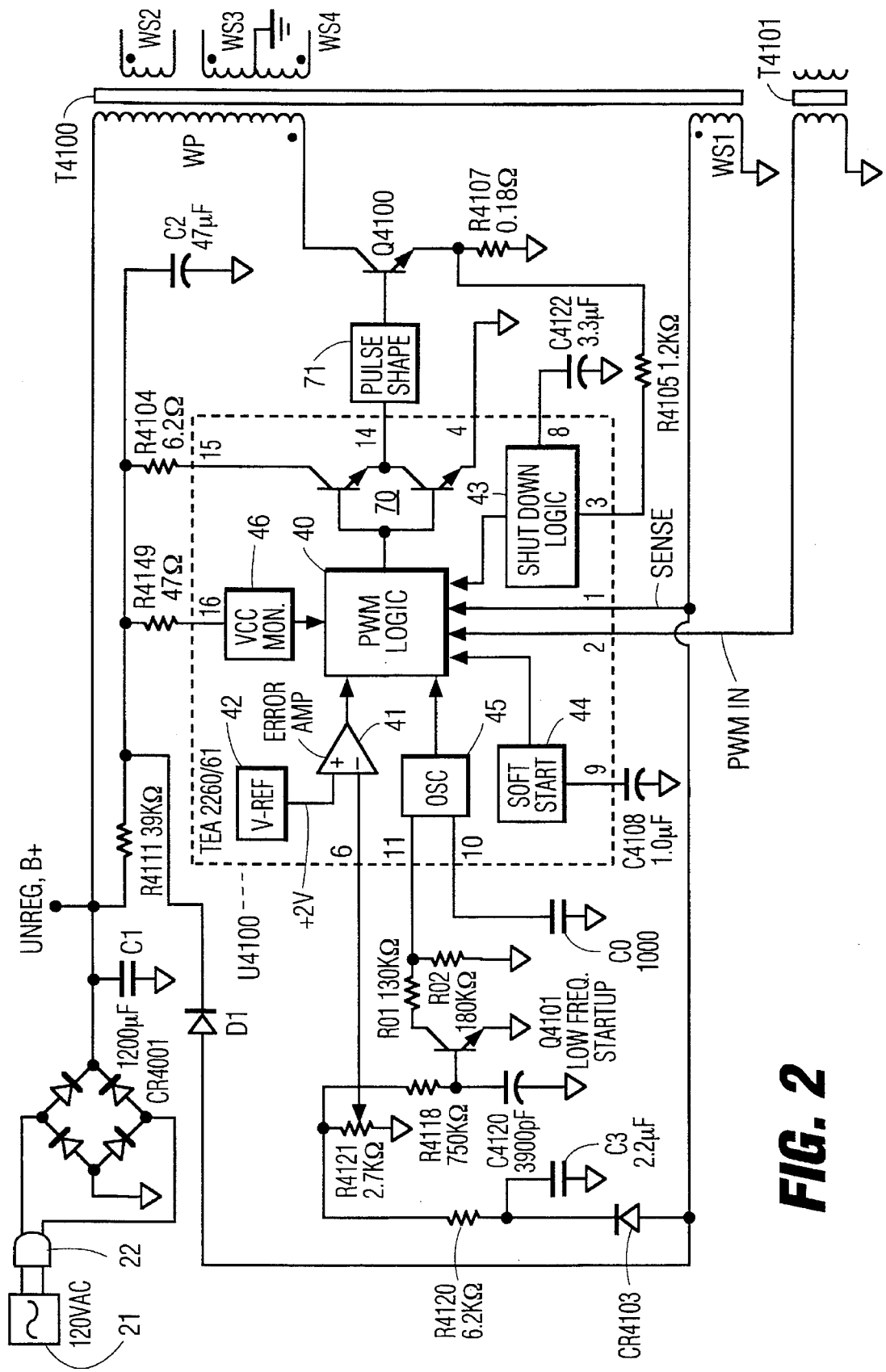
FIG. 2 is a more specific schematic diagram showing the standby regulator or hot ground side of the power supply in greater detail.
Figure 3A:
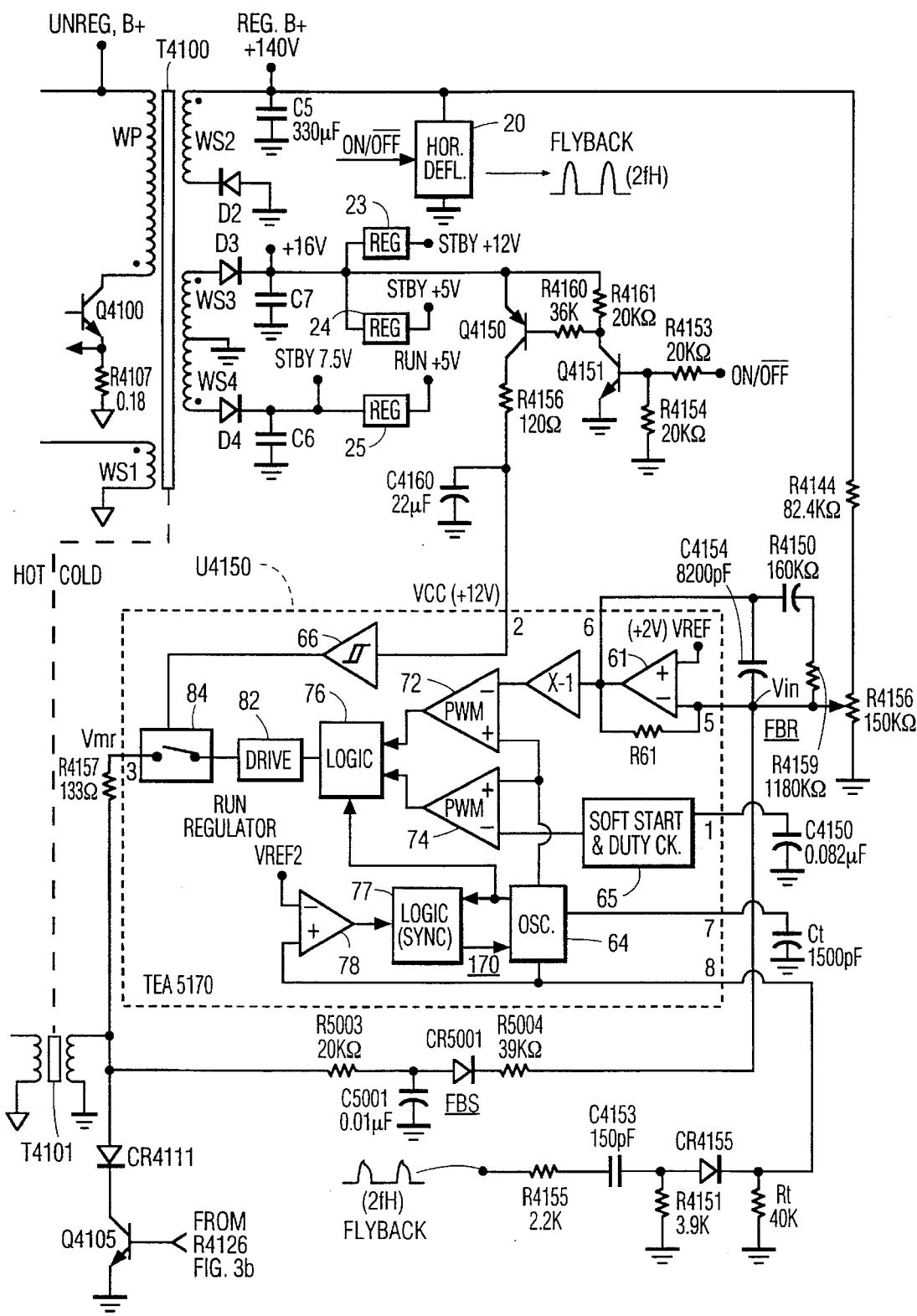
FIGS. 3a and 3b illustrate a more specific schematic of the run regulator side.
Figure 3B:
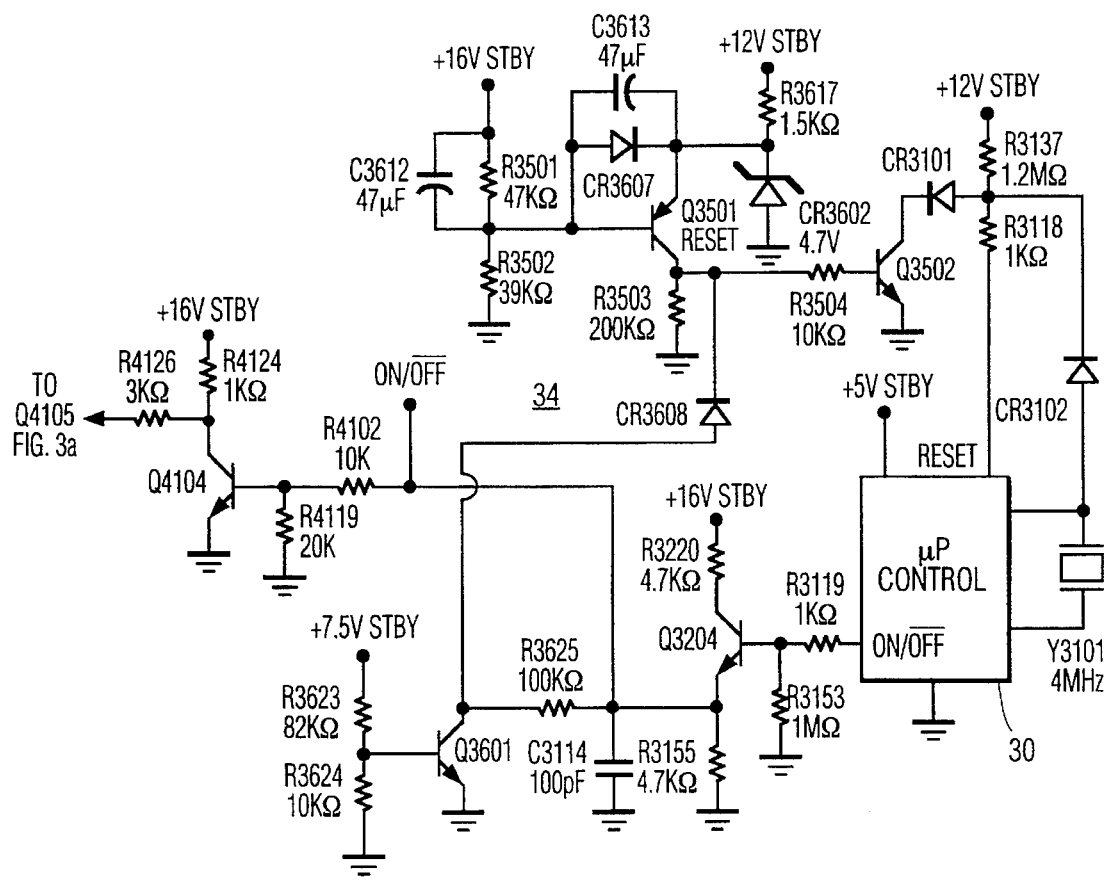

FIG. 2 is a schematic showing a detailed embodiment of the standby or hot chassis side of the power supply of FIG. 1, and FIG. 3 is a detailed schematic showing the run side or cold chassis side. Corresponding reference numbers are used to identify the same components throughout the figures. In each case, specific component values and pin numbers show the coupling of signals to the pulse generation and protective circuits of the two regulators U4100 and U4150.

In the embodiment shown in FIG. 2, the standby regulator includes a pulse width modulation element 40, responsive to the output of error amplifier 41 and coupled to chopper Q4100 through a push-pull output stage 70 and a pulse shaping circuit 71. The inverting input of error amplifier 41 is coupled to the voltage on secondary winding WS1, via rectifier CR4103, capacitor C3, resistor R4120 and potentiometer R4121. The noninverting input is coupled to an internal voltage reference 42, of e.g. 2 volts.

Protective features include a shut down logic module 43 coupled to current sense resistor R4107 via a series resistor R4105. The shut down logic module is also coupled to a capacitor C4122 that accumulates a charge representing the current level in chopper Q4100. Shut down module 43 has two thresholds, a lower threshold triggering pulse width modulation logic 40 to immediately terminate the output pulse in a given cycle and to charge capacitor C4122 as a means to detect ongoing high current conditions. For persistent high current conditions or with instantaneous current over a higher threshold, triggering logic 40 latches to disable the output permanently, until VCC voltage is removed from regulator U4100 by disconnecting AC mains power. Whereas the current sensing arrangement relies in part on accumulating overcurrent events via capacitor C4122, there is a built in time delay to permanent shutdown in responding to high current conditions up to the lower threshold.

A VCC monitor 46 is coupled to the supply voltage through a resistor R4149 and functions as a voltage threshold detector. The VCC monitor at least temporarily disables the output of the regulator upon sensing low voltage at VCC pin 16. However, in the event of a loss of AC mains power, the voltage at pin 16 falls exponentially at a rate determined by the loading of capacitor C2. Thus VCC monitor 46 also has a built in time delay.

PWM 40 also includes logic that limits the duty cycle of chopper transistor Q4100 to values below a predetermined fixed maximum.

When first connecting the television receiver to the AC mains, there is a large power requirement for charging storage capacitors and the like, even though the power supply is arranged to start up in the standby mode. A soft start circuit 44 is coupled to PWM module 40, to control ramping up of the amplitude of the output of the regulator when first engaging the load. The amplitude is controlled as a function of the voltage on a capacitor C4108, which charges upon commencement of operation.

In the standby mode, regulator U4100 operates independently of pulse signals from the run regulator. Local oscillator 45 defines the frequency of the width-modulated pulses. The free running frequency is determined by the RC network of resistors R01 and R02 coupled to a first input to the oscillator, and a capacitor CO coupled to a second input. As another soft start feature, the oscillator is operated at a reduced frequency having resistor R01 coupled to ground via an initially nonconductive transistor Q4101. At startup, after a delay introduced by the voltage on a capacitor C4120 charging through resistors R4118 and R4120 to more than the forward base-emitter voltage of transistor Q4101, the transistor turns on. Resistor R01 is then coupled in parallel with resistor R02, thereby increasing the free running oscillator frequency after startup.

FIG. 3 illustrates the run regulator in detail, and also shows the particulars of system control and switching arrangements that provide for startup in the standby mode and switching between standby and run modes. The circuitry of FIG. 3 is operable to switch VCC to the run regulator and also to enable and disable application of the run regulator output back to the standby regulator via transformer T4101. The switching functions are generated by the ON/OFF signal from system control microprocessor 30, that is programmed to switch between the on (run) and off (standby) states as required, for example, in response to control signals received from a remote control and infrared receiver, not shown.

Run regulator U4150 senses the regulated B+ scanning voltage developed from secondary winding WS2 by diode D2 and capacitor C5. This voltage is coupled to error amplifier 61 via regulator negative feedback circuit FBR that comprises a voltage divider of resistors R4144, R4159 and potentiometer R4156. The B+ voltage is compared to internal DC voltage reference VREF1 of e.g. +2 V. A gain stabilizing AC negative feedback path is provided by capacitor C4154 and by an RC combination, C4163 and R4150. An internal resistor R61 establishes the DC gain of the B+ regulating, negative feedback loop.

The run regulator has two pulse width modulators, 72 and 74. The first PWM 72 is coupled to the output of error amplifier 61 and the second PWM 74 is coupled to the output of a soft start and duty cycle limiter 65. Limiter 65 charges a capacitor C4151 for gradually increasing the output pulse amplitude upon commencement of operation in the run mode, similar to the soft start operation of standby regulator U4100. Additionally, limiter 65 defines a maximum duty cycle for the output.

The outputs of PWM 72 and 74 are coupled to a logic block 76, that selects between the two outputs, in particular selecting the narrower pulse. This pulse is coupled to driver 82, which can be a push-pull stage similar to that of the standby regulator.

The run regulator also has a VCC sensing circuit 66, operable to block the output in the event VCC falls, below a minimum level or rises above a maximum level. VCC monitor 66 is coupled to a switching element 84 for blocking the output. The output of driver 82, through switching element 84, is coupled via a series resistor R4157 to a cold side primary winding of signal transformer T4101, the secondary winding being coupled to a control input of the standby regulator.

In the run mode, the run regulator operates synchronously with horizontal scanning the television receiver. An oscillator stage 170 including an amplifier 78, a logic-synchronizer 77 and a controllable oscillator 64 provides triggering pulses to PWM 72 and 74 and logic element 76. To synchronize the oscillator with horizontal scanning, the oscillator stage receives positive going AC horizontal flyback pulses developed by deflection circuit 20. The flyback pulses are reduced in amplitude by voltage dividing resistors R4155 and R4151 and applied to the oscillator via a diode CR4155 which blocks the negative going portion of the pulses. A DC blocking capacitor C4153 is coupled between resistors R4155 and R4151. A capacitor Ct and a resistor Rt define a free running frequency for operation in the absence of flyback pulses.

System control microprocessor 30 operates from a standby +5 V supply, which is present whenever AC power is supplied by the mains. The standby +5 V supply is developed from the +16 V standby source via a regulator 24. When power is initially supplied to the chassis, reset circuit 34 provides a power up reset via transistors Q3501 and Q3502, holding the reset input to microprocessor 30 low for about 100 millisecond after power is initially available on the standby 5 V supply. This prevents the microprocessor from operating until the standby 5 V has a chance to stabilize. The reset circuit also pulls the reset line low during power loss. During reset, microprocessor 30 is held in a low power mode, by pulling down the voltage at a crystal Y3101 via a diode CR3102, thus stopping the main clock, and stopping all operations of the microprocessor.

Reset circuit 34 uses the level of the 16 V standby source from secondary winding WS3, which also develops the 12 V standby source, via a regulator 23. The 16 V source is developed from winding WS3 via a diode D3 and a capacitor C7. When AC power is applied and the standby sources are rising, the emitter of transistor Q3501 is held at 4.7 volts from the 12 V standby source, by a zener diode CR3602 and a resistor R3617. The base voltage of transistor Q3501 is determined by the voltage divider of resistors R3501 and R3502, and initially is lower than the 4.7 V at the emitter of transistor Q3501, thereby turning on transistor Q3502 and generating the reset by pulling down the reset input through a diode CR3101 and a resistor R3118. When the 16 V source has risen to about 9 V, Q3501 is switched off, removing the base voltage at Q3502 and switching it off. The reset line to the microprocessor then rises via a resistor R3137 coupled to the 12 V supply. Diode CR3102 is then reverse biased and the crystal Y3101 can resume oscillation.

The reset line is pulled low momentarily if a momentary load variation such as a kine arc is detected. Two capacitors, C3612 and C3613, couple surges or glitches in the standby 16 V source to transistor Q3501. If a surge or glitch exceeds 1.2 volts, Q3501 conducts and pulls the reset line low.

During power loss, the reset circuit pulls the reset line low before the standby 5 V source falls to a point that results in erroneous operation of control microprocessor 30. To trigger a reset before the standby 5 V source becomes undependable, the reset circuit monitors the standby 16 V source at the base of transistor Q3501. The 16 V source is used to develop the standby 5 V source, and will maintain the 5 V level until the 16 V source drops substantially. Thus a loss of 16 V is detected before the 5 V source drops. A drop in the 16 V source to about 9 V turns on transistor Q3501 due to the voltage divider of resistors R3501 and R3502.

A reset signal is also generated if there is a power loss in the run 5 V supply, due e.g. to an overload. The run 5 V supply is developed from a standby 7.5 V source via a regulator 25. The 7.5 V source is developed from secondary winding WS4 via a diode D4 and a capacitor C6. If the standby 7.5 V source drops below 5.4 V and the ON/OFF output of the microprocessor 30 is high, such that transistor Q3204 is conducting from the 16 V supply via resistors R3119 and R3220, i.e., when in the run mode, a transistor Q3601 is turned off due to the voltage divider of resistors R3623 and R3624. A diode CR3608 is then forward biased, turning on transistor Q3502 and generating a reset.

Once the reset line is pulled low, the system control microprocessor is placed in a low power mode, its oscillator is stopped and all its functions are suspended. This reduces the load on the 5 V supply, and allows it to stay above at least 1 V for a substantial period, maintaining the data stored in the microprocessor memory for resumption of operation according to the same conditions (e.g., channel number, volume setting, etc.) if power is shortly restored.

The ON/OFF signal generated from control microprocessor 30 is coupled, via a resistor R3119, to switch conduction of an on/off transistor Q3204, with the high, ON-state turning the transistor on and the low, OFF-state turning the transistor off. A collector load is supplied by a resistor R3220, and an emitter resistor R3155 is supplied with a bypass capacitor C3114.

The ON/OFF signal developed at the emitter of transistor Q3204 is coupled to the base of a transistor Q4104 via resistors R4102 and R4119. The collector of Q4104 is coupled to the +16 V supply via a resistor R4124 and to the base of a transistor Q4105 via a resistor R4126.

To place the switched mode power supply into standby mode, the output of run regulator U4150 is pulled down by turning transistor Q4104 off and turning transistor Q4105 on. This pulls down the output through a diode CR4111.

The ON/OFF signal also controls coupling of VCC to the run regulator from the 16 V supply. The ON/OFF signal is coupled to turn on a transistor Q4151 in the run mode, via resistors R4153 and R4154. The collector load for Q4151 is a resistor R4161 and the base of a PNP transistor Q4150. The voltage at the base of transistor Q4150 is thereby pulled down through a resistor R4160 turning the transistor on and coupling the 16 V supply to run regulator U4150 by charging a filter capacitor C4160 through a resistor R4156.

The ON/OFF output terminal of microprocessor 30 is internally configured as a tristate output. The high state is a low source impedance, active state at a +5 V level. The low state is a low source impedance active state, at a 0 V level. The third state is a high impedance state, where the source impedance of the terminal is very high.

The run mode, on-state of the ON/OFF signal from microprocessor 30 is the +5 V active high state. The normal, standby off-state, generated by e.g. operation of the remote control, is the 0 V active low state. The off-state is also generated when a reset signal is supplied to microprocessor 30 by reset circuit 34. In this situation, microprocessor 30 places its ON/OFF terminal in a high impedance state, enabling the base of transistor Q3204 to be pulled down to ground by a resistor R3153. This turns off the transistor and initiates the sequence of events, previously described, which places the television receiver in a standby mode of operation.

According to the ON/OFF, reset and protective circuits as shown and discussed, there are a variety of ways in which the run and standby regulators are coordinated in their operating modes. However, this coordination depends on timing considerations such as the falling of particular power supply voltages and the like. In the interval between the beginning of a power loss and the point at which the run regulator is disabled, the regulated B+ voltage tends to drop, causing the run regulator to increase the duty cycle of the pulse output voltage Vmr. This creates a situation with potential damage to chopper transistor Q4100.

Reset signal generator 34, being located on the cold ground reference side, cannot detect too rapidly power outages on the hot ground reference side, such as loss of AC mains supply. Thus the reset signal generator cannot be relied on to place the run regulator in standby before stressful variations in duty cycle are encountered.

Another potentially damaging situation may be created with a sudden increase in loading requirements. The run regulator may react by driving the duty cycle to the maximum permitted by duty cycle limiting circuit 65 in such a way as to stress the system.

According to an inventive arrangement, safety feedback circuit FBS, comprising resistor R5003, capacitor C5001, diode CR5001 and resistor R5004, dampens the response of the run regulator to such conditions. The circuit prevents excessive or too rapid increases in duty cycle, or the production of undesirable drive oscillations to the chopper transistor.

In the run mode, PWM voltage Vmr is a bilevel voltage, cyclical at 2 fH frequency, and switching in levels between e.g. 0.8 volt and 6.9 volt. The average value of voltage Vmr is a positive value which is a function of the pulse duty cycle, increasing in magnitude with increasing duty cycle or on-time chopper drive.

PWM voltage Vmr is applied to integrator 100 of safety feedback circuit FBS to develop this average value as a safety feedback voltage, Vsf, across integrating capacitor C5100. The RC time constant of integrator 100 is large enough to substantially eliminate the 2 fH fundamental and harmonic component voltage frequencies of voltage Vmr. The time constant must however be fast enough to enable feedback circuit FBS to respond to changes in the duty cycle of voltage Vmr under stressful or abnormal operating conditions.

If the duty cycle of PWM voltage Vmr exceeds a certain threshold due to a drop in B+ voltage level, feedback voltage Vsf becomes great enough to forward bias blocking diode CR5100. With diode CR5100 conducting, feedback voltage Vsf is applied through resistor R5004 to the negative input terminal of error amplifier 61. In a negative feedback manner, via a loop that includes output voltage Vmr and safety feedback circuit FBS, error amplifier 61, with its high gain, causes the duty cycle of PWM voltage Vmr to be limited to a value which maintains the voltage Vin at the negative input terminal equal to Vref1, the reference voltage level established at the positive input terminal.

Regulator negative feedback circuit FBR supplies a decreasing feedback voltage from the wiper arm of R4156 in an attempt to maintain constant the falling B+ voltage level. It attempts to do this by increasing the duty cycle of PWM voltage Vmr. The feedback operation of safety feedback circuit FBS opposes the feedback operation of regulator feedback circuit FBR, and, when activated, the safety feedback circuit overrides the regulator feedback circuit and limits the duty cycle of voltage Vmr in a safe manner.

FIGS. 4 through 7 show the effects of safety feedback circuit FBS in several operational conditions of the television receiver, during run mode. FIGS. 4a–7a are timing diagrams showing various parameters of the switched mode power supply, with the inventive safety feedback circuit FBS in-circuit, whereas FIGS. 4b–7b show timing diagrams with circuit FBS removed.

Figure 4A:
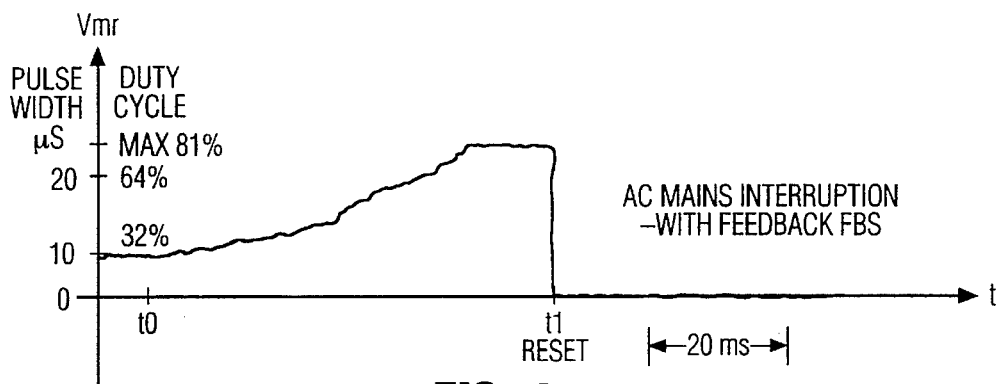
FIGS. 4a and 4b are timing diagrams comparing the duty cycles of the switched mode power supply during an AC mains power interruption, with and without the safety feedback circuit coupled to the run regulator of FIGS. 1 and 3.
Figure 4B:
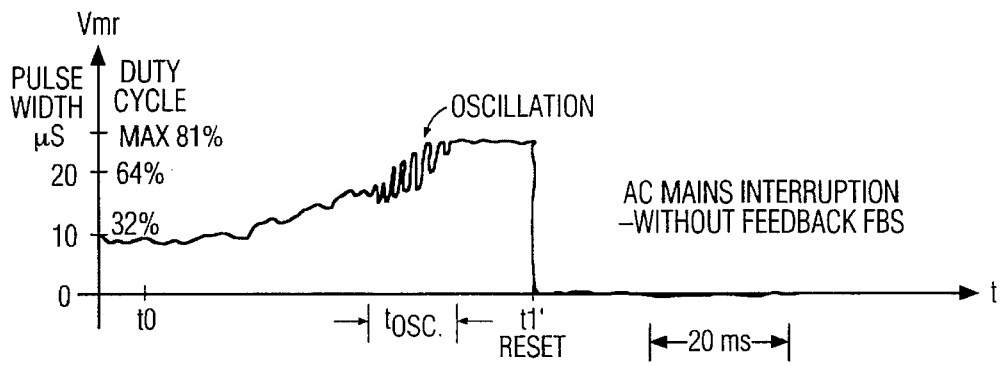

FIGS. 4a and 4b compare the on-time and duty cycle of PWM output voltage Vmr, with and without safety feedback, during an AC mains power loss or interruption occurring at approximately time t0. The duty cycle in FIG. 4a, with safety feedback, ramps smoothly up to a maximum duty cycle permitted by duty cycle limiter 65 in the run regulator, and remains at the maximum until reset circuit 34 is activated at time t1. Microprocessor 30 then outputs the OFF state of the ON/OFF control signal, which disables run regulator U4150 and drops the duty cycle and the pulse width of the output to zero.

A corresponding plot of the pulse width without safety feedback is shown in FIG. 4b, wherein the pulse width also increases to the maximum after AC mains interruption occurs at time t0', but the increase is characterized by substantial undesirable oscillation in the pulse width, and therefore the duty cycle, over an approximately 10 millisecond interval, tosc, before reaching the maximum. Reset generator 34 is incapable of responding rapidly to a power loss. Microprocessor 30 does not supply the OFF state of the ON/OFF command signal until time t2', a time after the duty cycle oscillations have commenced. In contrast, in FIG. 4a, safety feedback circuit FBS advantageously comes into action early enough, before the reset signal is generated, to provide smooth duty cycle limiting of pulse modulated signal Vmr.

Figure 5A:
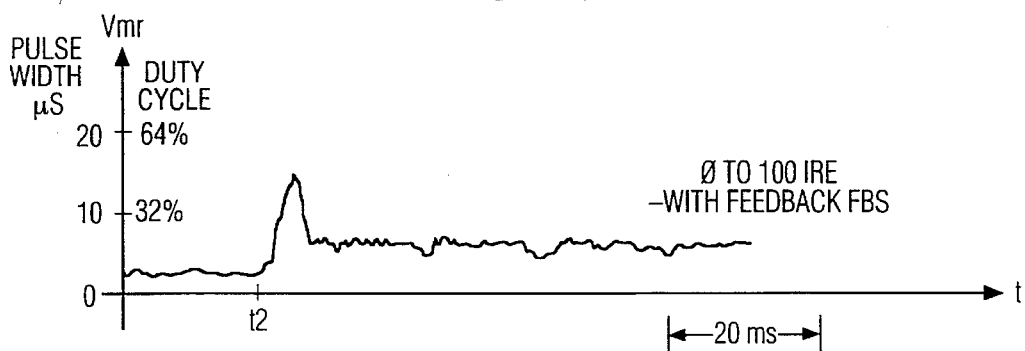
FIGS. 5a and 5b are duty cycle timing diagrams comparing the duty cycles during video loading variation by flashing between maximum and minimum display brightness, with and without the feedback.
Figure 5B:
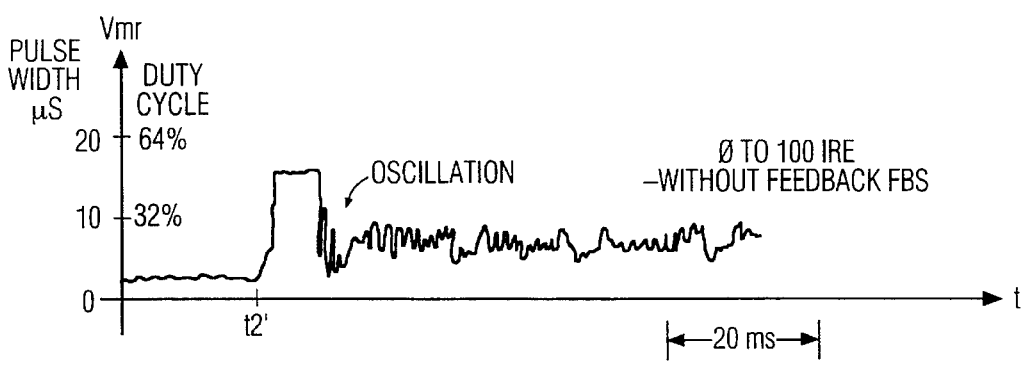

FIGS. 5a and 5b are pulse on-time and duty cycle timing diagrams comparing the two parameters during video loading variation occasioned by switching from a flat field of minimum brightness level to one of maximum level, 0 to 100 IRE, with feedback in FIG. 5a and without feedback in FIG. 5b. The difference in power supply loading is about 40 to 50 watts, as compared to the power supply maximum output power level of 277 watts in this example. These curves were also generated during a condition of low AC line input voltage of 99VAC, thus placing the normal duty cycle of the run regulator in the higher portion of its range.

In FIG. 5a, the duty cycle passes a peak just after the transition, at time t2, between the 0 IRE flat field display and the 100 IRE flat field display, settling back to a higher but stable level after the peak. In corresponding FIG. 5b, however, the duty cycle plateaus at the maximum for a period following the transition time t2', and thereafter is characterized by greater oscillation than in FIG. 5a, particularly as the pulse width falls from the maximum to one representing operation at the higher loading level.

Figure 6A:
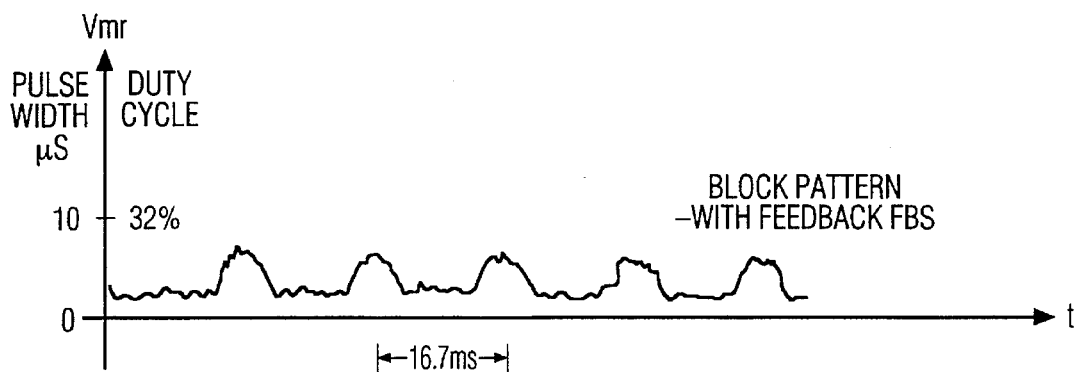
FIGS. 6a and 6b likewise compare duty cycles during video loading variation upon display of a white block test pattern.
Figure 6B:
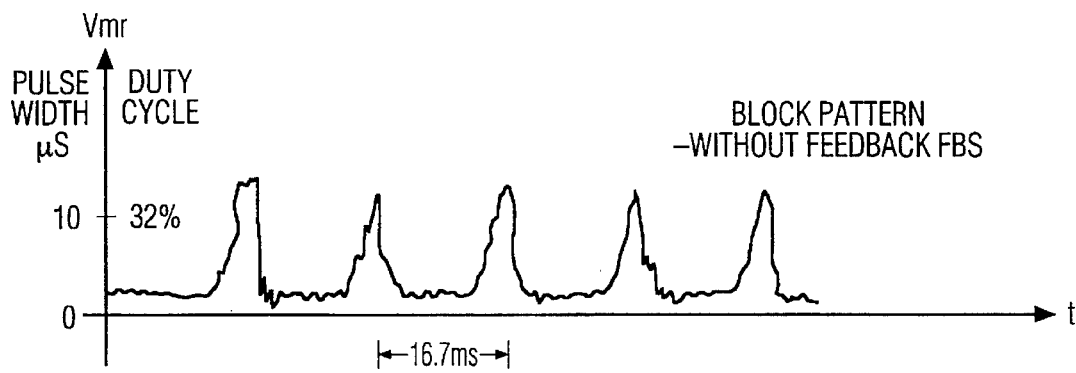

FIGS. 6a and 6b likewise compare the on-times and duty cycles of output voltage Vmr during video loading variation upon display of a repetitive block pattern of maximum brightness. With feedback as shown in FIG. 6a, the pulse duty cycle increases with added loading, but the duration of each increased duty cycle pulse tends to be stretched out and to reach a lower peak value as compared to operation without feedback as shown in FIG. 6b. The result is improved protection of the chopper circuit and improved regulation of the B+ voltage.

Figure 7A:
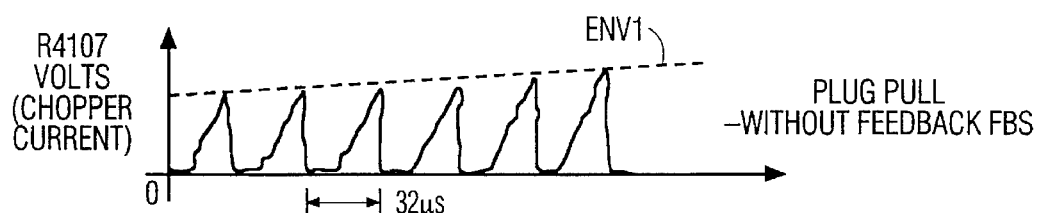
FIGS. 7a and 7b are voltage timing diagrams at resistor R4107, representing the chopper transistor collector current variations during AC mains power loss, with and without the feedback.
Figure 7B:
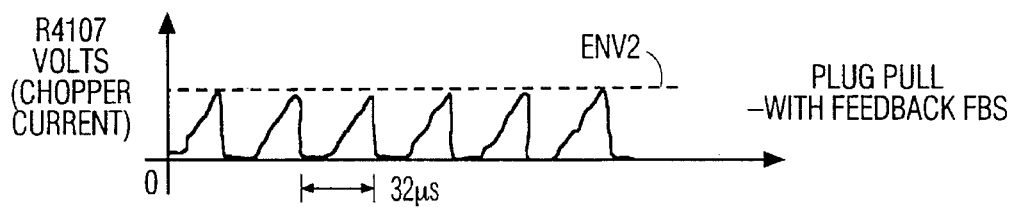

The effect of feedback circuit FBS on current variations in the primary winding and in the chopper transistor Q4100 after a loss of AC mains power is apparent from a comparison of FIGS. 7a and 7b. Chopper transistor Q4100 is coupled to primary winding of power transformer T4100. Thus the current in the primary winding ramps up exponentially when the chopper transistor Q4100 conducts. Without feedback, as shown in FIG. 7a, increasing the output pulse width allows the current to ramp up each cycle in a manner which increases the peak current in the chopper transistor according to the slope of the current envelope shown by broken line ENV1. In FIG. 7b, where the variation in pulse width is limited by feedback circuit FBS on the run regulator, the slope of the increasing current envelope ENV2 is lower, such that a lower peak current is reached by the time the reset circuitry and VCC switching circuits operate to force the power supply into the standby mode.

By using feedback to limit the duty cycle of pulse modulation voltage Vmr, safety feedback circuit FBS advantageously operates independently of the duty cycle limiter in run regulator U4150 and of the duty cycle limiter in standby regulator U4100. This provides an added margin of safety when the switched mode power supply encounters extremes of its operating parameters.

What is claimed is:

1. A switched mode power supply, comprising:
    a modulator having an input for receiving a sense signal and an output for developing a pulse modulated signal;
    switching means coupled to said modulator and being switched by a switching signal developed in accordance with said pulse modulated signal;
    supply means for generating a supply voltage responsive to operation of said switching means; and
    limiting means coupled to a feedback path to feed back said modulator output to a modulator input for limiting the duty cycle of said pulse modulated signal,
    wherein said modulator modulates the pulse modulated signal in a first sense, said limiting means being activated when the duty cycle of said pulse modulated signal reaches a maximum value and modulates said pulse modulated signal in an opposing sense to maintain said duty cycle substantially at said maximum value.

2. The power supply according to claim 1 wherein said modulator modulates the duty cycle of said pulse modulated signal in said first sense and said limiting means modulates the duty cycle of said pulse modulated signal in said opposing sense.

3. The power supply according to claim 1 wherein said limiting means comprises means for developing a signal representative of the duty cycle of said pulse modulated signal and applying means for applying said duty cycle representative signal to said modulator when said duty cycle goes beyond a predetermined threshold.

4. The power supply of claim 3 wherein said applying means is responsive to the duty cycle representative signal and to the sense signal.

5. The power supply according to claim 3 wherein said applying means comprises a diode coupled between said modulator output and said modulator input.

6. The power supply according to claim 3, wherein said duty cycle representative signal developing means comprises averaging means for averaging said pulse modulated signal.

7. The power supply according to claim 6 wherein said averaging means comprises an integrator.

8. The power supply according to claim 7 wherein said integrator has a time constant which removes the fundamental frequency component of said pulse modulated signal.

9. The power supply according to claim 8 wherein said applying means comprises a diode coupled to said integrator and to said modulator input.

10. A switched mode power supply, comprising:

a modulator having an input for receiving a sense signal and an output for developing a pulse modulated signal;

switching means coupled to said modulator and being switched by a switching signal developed in accordance with said pulse modulated signal;

supply means for generating a supply voltage responsive to operation of said switching means; and limiting means coupled in a feedback path to feed back said modulator output to a modulator input for limiting the duty cycle of said pulse modulated signal, wherein said modulator is responsive to an ON/OFF command signal generated by a controller, said controller generating the OFF-state of said command signal responsive to a reset signal generator which generates a reset signal upon detection of a power loss, and wherein said limiting means, upon occurrence of said power loss, provides limiting of the duty cycle of said pulse modulated signal prior to detection of said power loss by said reset signal generator.

11. A switched mode power supply, comprising:

a modulator having an input for receiving a sense signal and an output for developing a pulse modulated signal;

switching means coupled to said modulator and being switched by a switching signal developed in accordance with said pulse modulated signal;

supply means for generating a supply voltage responsive to operation of said switching means;

limiting means coupled to a feedback path to feed back said modulator output to a modulator input for limiting the duty cycle of said pulse modulated signal; and a first feedback circuit responsive to said supply voltage for generating said sense signal to provide regulation thereof, said limiting means comprising a second feedback circuit coupled to said modulator which opposes said first feedback circuit.

12. The power supply according to claim 11 wherein said modulator includes a duty cycle limiting circuit operating independently of said limiting means.

13. The power supply according to claim 11, including a switch control circuit coupled to said modulator for supplying said switching signal to said switching means, and means coupled to said switch control circuit for developing a signal representative of main current in said switching means to disable normal operation of said switching means under excessive main current.

14. The power supply according to claim 13 wherein said switch control circuit includes a first duty cycle limiting circuit operating independently of said limiting means.

15. A switched mode power supply, comprising:

a modulator having an input for receiving a sense signal and an output for developing a pulse modulated signal;

switching means coupled to said modulator and being switched by a switching signal developed in accordance with said pulse modulated signal;

supply means for generating a supply voltage responsive to operation of said switching means;

limiting means coupled in a feedback path to feed back said modulator output to a modulator input for limiting the duty cycle of said pulse modulated signal;

a switch control circuit coupled to said modulator for supplying said switching signal to said switching means; and means coupled to said switch control circuit for developing a signal representative of main current in said switching means to disable normal operation of said switching means under excessive main current, wherein said switch control circuit includes a first duty cycle limiting circuit operating independently of said limiting means, and said modulator includes a second duty cycle limiting circuit operating independently of said limiting means and of said first duty cycle limiting circuit.

16. The power supply circuit according to claim 15 wherein modulator is operative during a run mode to provide voltage regulation and is disabled during a standby mode, with said switch control circuit thereafter being operative to provide voltage regulation.

17. The power supply according to claim 16 wherein said modulator is cold ground referenced and said switch control circuit is hot ground referenced.

18. A switched mode power supply, comprising:

a modulator having an output for developing a pulse modulated signal;

switching means;

a switch control circuit coupled to said modulator and to said switching means for supplying to said switching means a switching signal responsive to said pulse modulated signal;

supply means for generating a supply voltage responsive to operation of said switching means;

first feedback means coupled to an input of said modulator and responsive to a sense signal representative of variations in said supply voltage for modulating in a first sense said pulse modulated signal to regulate said supply voltage; and second feedback means coupled between an input of said modulator and said output of said modulator for modulating said pulse modulated signal in a sense opposing that of said first feedback means.

19. A switched mode power supply, comprising:

a modulator having an input for receiving a sense signal representative of a supply voltage and an output for developing a pulse modulated signal;

switching means coupled to said modulator and being switched by a switching signal developed in accordance with said pulse modulated signal;

supply means for generating said supply voltage responsive to operation of said switching means;

means responsive to said pulse modulated signal for developing a control signal which varies with the duty cycle of said pulse modulated signal; and means responsive to said control signal for providing another sense signal as positive feedback to an input of said modulator to vary said pulse modulated signal in a way which limits said duty cycle.

* * * * *